No. 817,787. PATENTED APR. 17, 1906.
F. J. LANCASTER.
VEHICLE WHEEL.
APPLICATION FILED JAN. 25, 1905.
2 SHEETS—SHEET 1.
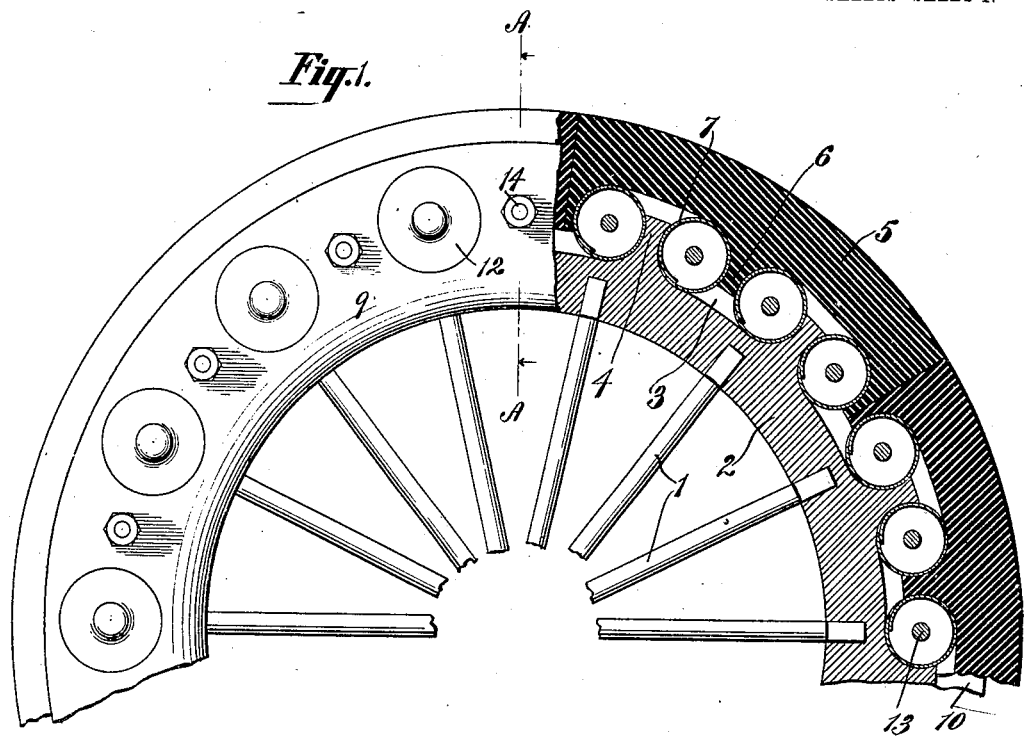
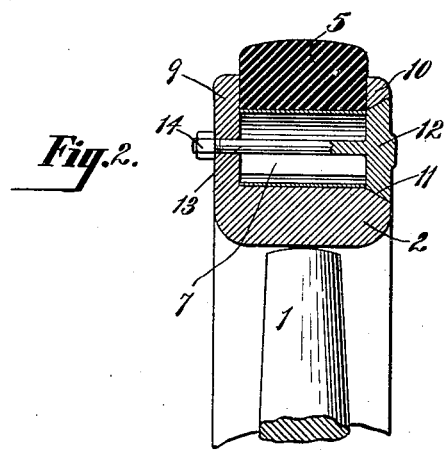
Witnesses:
F. G. Hachenberg.
Henry Thieme.
Inventor:
Frederick J. Lancaster
by attorneys
Brown & Seward No. 817,787. PATENTED APR. 17, 1906.
F. J. LANCASTER.
VEHICLE WHEEL.
APPLICATION FILED JAN. 25, 1905.
2 SHEETS—SHEET 2.
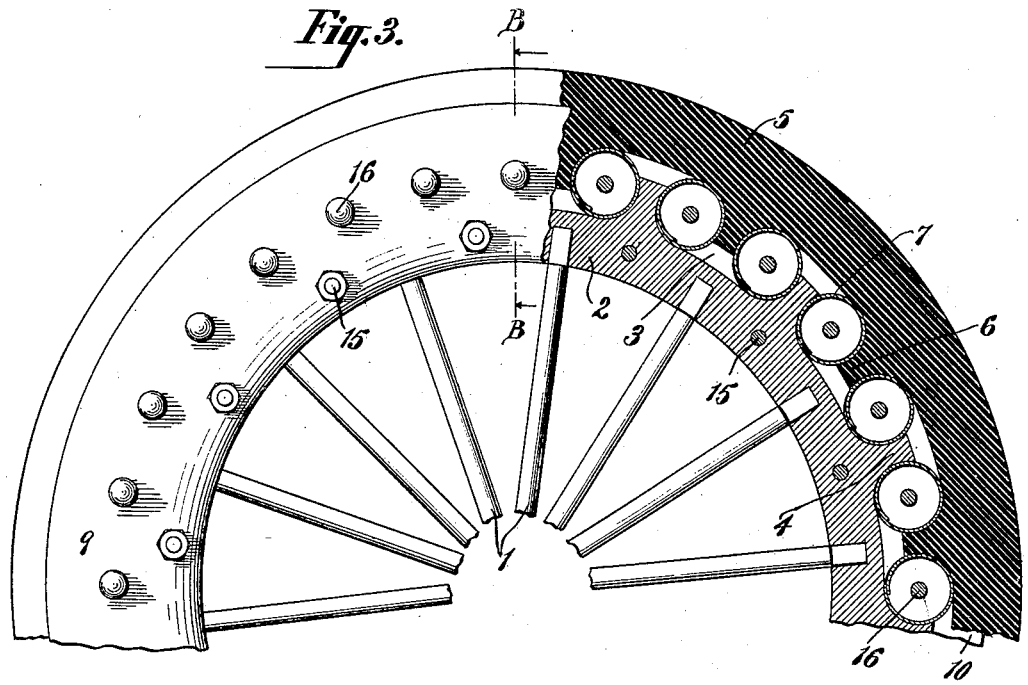
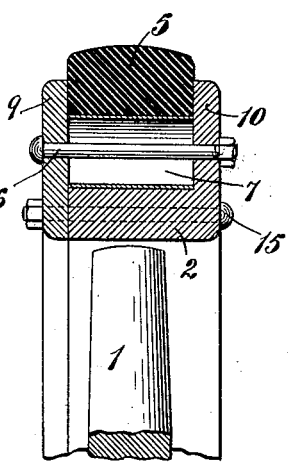
Witnesses:
Inventor:
Frederick J. Lancaster
by attorneys

UNITED STATES PATENT OFFICE.

FREDERICK J. LANCASTER, OF NEW YORK, N. Y.

VEHICLE-WHEEL.

No. 817,787.  Specification of Letters Patent.  Patented April 17, 1906.

Application filed January 25, 1905. Serial No. 242,596.

*To all whom it may concern:*

Be it known that I, FREDERICK J. LANCASTER, a citizen of the United States, and a resident of the borough of Manhattan, in the city and State of New York, have invented a new and useful Improvement in Vehicle-Wheels, of which the following is a specification.

The object of my invention is to provide an improvement in vehicle-wheels, the novel features of the invention relating more particularly to the method of spacing a tire of soft rubber compound or analogous material from and interlocking it with the felly, the tire being unattached to any metallic band or its equivalent, thus securing the advantages of a pneumatic tire by the use of a solid tire.

In the accompanying drawings, Figure 1 represents in side elevation, partly in longitudinal central section, a vehicle-wheel illustrating one embodiment of my invention. Fig. 2 is a cross-sectional view in the plane of the line A A of Fig. 1. Fig. 3 is a view in side elevation, partially in longitudinal central section, of a vehicle-wheel, showing another embodiment of my invention; and Fig. 4 is a cross-sectional view in the plane of the line B B of Fig. 3.

The spokes of the vehicle-wheel are represented by 1 and the felly by 2. This felly is provided with alternating annular series of sockets 3 and rigid lugs 4.

The tire (denoted by 5) is composed of soft rubber compound or analogous material and is unattached to any metallic band or its equivalent which would tend to impair the free yielding of the tire on its springs. The tire is provided at its inner periphery with projections or recesses, in the present instance inwardly-extended yielding lugs 6, which extend into the sockets 3 in the felly and overlap the outwardly-extended lugs 4 of the felly. By the use of the term "projections or recesses" it is to be understood that I contemplate the formation of abutments for the interlocking engagement of the springs either by providing the tire with recesses or by providing the tire with lugs projecting from its inner periphery, as shown in the accompanying drawings.

Spring-cushions—such, for instance, as coil-springs 7—are located within the felly-sockets 3 and are interposed between the alternating felly and tire lugs 4 and 6. These springs are preferably made of spiral form, as shown, with their inner ends overlapping to a greater or lesser degree their outer ends. The walls of the lugs 4 and 6 are made curved, so as to fit the outer walls of the springs, and the lugs project beyond the centers of the springs, so as to cause the springs to have an interlocking engagement between the lugs. The outer ends of the lugs 4 are spaced a short distance from the inner walls of the flexible tire 5, and the inner ends of the lugs 6 are similarly spaced a short distance from the bottoms of the sockets 3 in the felly. This construction permits the tire to be interlocked with the felly, yet yieldingly spaced therefrom, and does away with the use of a metallic band or its equivalent for the tire, which would decrease its resiliency. This construction furthermore permits the tire to be placed upon driving-wheels as well as ordinary traction-wheels of a vehicle.

The felly 2 of the vehicle-wheel is provided with annular flanges 9 and 10, which overlap the sides of the tire 5, thus holding the tire against lateral displacement.

In the construction shown in Figs. 1 and 2 the parts may be assembled as follows: The flexible tire 5, composed of rubber compound or analogous material, may be split into one or more sections. The tire is inserted into position between the flanges 9 and 10. The coil-springs are then inserted through holes 11 in the side flanges, which holes are provided with tapered walls. A bolt having a head 12 fitted to each of the holes 11 is then inserted into position to retain the spring 7 in position, the shank 13 of the bolt projecting through the opposite flanges and there being provided with a lock-nut 14.

In the form shown in Figs. 3 and 4 one of the side flanges of the felly is made removable, an annular series of bolts 15 being utilized for locking the flange to the felly. In this instance a bolt 16 may be passed through the centers of the coil-springs 7 to hold the removable flange in the proper position to the fixed flange at this point. In this form the flexible tire may be made in a single undivided ring.

While I have shown and described two embodiments of my invention, it is evident that various other ways might be employed of attaching the tire to the felly. Hence I do not wish to limit myself strictly to either of the forms herein set forth; but

What I claim is—

1. The combination with a vehicle-wheel felly, of an annular series of independent springs arranged around the wheel-felly, and a tire of rubber compound or analogous material having an annular series of inwardly-extended lugs overlapping the springs whereby the tire is interlocked to and yieldingly spaced from the felly by the said springs.

2. The combination with a vehicle-wheel felly having an annular series of outwardly-extended lugs, of a tire of rubber compound or analogous material unattached to any metallic band or its equivalent and having an annular series of inwardly-extended lugs and springs engaging the lugs of the felly and tire for yieldingly spacing the tire from and interlocking it with the felly.

3. The combination with a vehicle-wheel felly having an annular series of outwardly-extended lugs, of a tire of rubber compound or analogous material unattached to any metallic band or its equivalent and having an annular series of inwardly-extended lugs and coil-springs interposed between each pair of alternating lugs for yieldingly spacing the tire from and interlocking it with the felly.

4. The combination with a vehicle-wheel felly having alternating annular series of sockets and lugs, of a tire of rubber compound or analogous material unattached to any metallic band or its equivalent and having an annular series of lugs extending into the said felly-sockets and springs located in the sockets engaging the tire and interposed between the said lugs for yieldingly spacing the tire from and interlocking it with the felly.

5. The combination with a vehicle-wheel felly having alternating annular series of sockets and lugs, of a tire having lugs extended into the said sockets and springs interposed between the lugs for yieldingly spacing the tire from and interlocking it with the felly, the said felly being provided with annular flanges for overlapping the sides of the tire.

6. The combination with a vehicle-wheel felly having an annular series of outwardly-extended rigid lugs, of a tire of rubber compound or analogous material unattached to any metallic band or its equivalent and having an annular series of inwardly-extended yielding lugs alternating with said rigid lugs and springs interposed between the rigid and yielding lugs for yieldingly spacing the tire from and interlocking it with the felly.

7. The combination with a wheel-felly having outwardly-extending projections, and a tire of rubber compound or analogous material having inwardly-extending projections, of independent springs arranged one between each of the projections of the felly and the next adjacent projection of the tire, substantially as specified.

8. The combination with a wheel-felly having outwardly-extending projections, and a tire of rubber compound or analogous material having inwardly-extending projections, of a spring filling the space between each of the projections of the felly and the next adjacent projection of the tire, substantially as specified.

9. The combination with a wheel-felly having outwardly-extending projections, of a tire of rubber compound or analogous material having inwardly-extending projections, and independent springs arranged so as to have support upon the wheel-felly, and to severally and independently give direct support locally to the portions of the tire outside of them, substantially as specified.

10. The combination with a wheel-felly, of a tire of rubber compound or analogous material having inwardly-extending projections, and independent springs constructed and arranged so as to have their axes substantially parallel with the axis of the wheel-felly and interposed between the said projections of the tire and supported by the wheel-felly, substantially as specified.

11. The combination with a wheel-felly having outwardly-extending projections, of a tire of rubber compound or analogous material having inwardly-extending projections, and independent springs constructed and arranged so as to have their axes substantially parallel with the axis of the wheel-felly and interposed between the said projections of the felly and tire, substantially as specified.

12. A wheel-felly, a tire of rubber compound or analogous material, and springs arranged between said two parts, all being so combined that the felly and tire shall be prevented from any substantially independent rotary movement, without being directly fastened one to the other, and so that the springs shall be independent and serve to locally support portions of the tire outside of them, substantially as specified.

13. A wheel-felly, a tire of rubber compound or analogous material, and springs arranged between said two parts, all being so combined that the felly and tire shall be prevented from any substantially independent rotary movement, without being directly fastened one to the other, and so that the springs shall be separated and independent and serve to locally support portions of the tire outside of them, substantially as specified.

14. The combination with a wheel-felly and a tire of rubber compound or analogous material locked against longitudinal movement thereon, of a plurality of independent springs having their axes substantially parallel with the axis of the wheel-felly.

In testimony that I claim the foregoing as my invention I have signed my name, in presence of two witnesses, this 23d day of January, 1905.

FREDERICK J. LANCASTER.

Witnesses:
FREDK. HAYNES,
C. S. SUNDGREN.